US012683107B2

(12) United States Patent
Erosa Zepeda et al.

(10) Patent No.: US 12,683,107 B2
(45) Date of Patent: Jul. 14, 2026

(54) UNIVERSAL CIRCUIT INTERRUPTER MOUNTING ASSEMBLIES

(71) Applicant: EATON INTELLIGENT POWER LIMITED, Dublin (IE)

(72) Inventors: Jorge Alberto Erosa Zepeda, Mexico City (MX); Brandon Alberto Garzon Gonzalez, Cuautitlán Izcalli (MX)

(73) Assignee: EATON INTELLIGENT POWER LIMITED, Dublin (IE)

( * ) Notice: Subject to any disclaimer, the term of this patent is extended or adjusted under 35 U.S.C. 154(b) by 168 days.

(21) Appl. No.: 18/413,271

(22) Filed: Jan. 16, 2024

(65) Prior Publication Data

US 2025/0232938 A1 Jul. 17, 2025

(51) Int. Cl.
*H01H 71/02* (2006.01)
*H01H 71/08* (2006.01)

(52) U.S. Cl.
CPC .... *H01H 71/0271* (2013.01); *H01H 71/0207* (2013.01); *H01H 71/08* (2013.01)

(58) Field of Classification Search
CPC . H01H 71/0271; H01H 71/0207; H01H 71/08
USPC .......................................................... 361/627
See application file for complete search history.

(56) References Cited

U.S. PATENT DOCUMENTS

| | | | | | |
|---|---|---|---|---|---|
| 3,334,277 | A * | 8/1967 | Strobel | H02B 1/20 | 361/661 |
| 3,366,846 | A * | 1/1968 | Brumfield | H02B 1/20 | 361/652 |
| 3,491,268 | A * | 1/1970 | Koenig | H02B 1/056 | 361/652 |
| 3,757,170 | A * | 9/1973 | Kobryner | H02B 1/04 | 361/652 |
| 3,986,081 | A * | 10/1976 | Norden | H02B 1/056 | 361/636 |
| 4,205,892 | A * | 6/1980 | Clement | H02B 1/056 | 439/721 |
| 4,587,391 | A * | 5/1986 | Harper | H01H 71/0264 | 248/27.1 |
| 5,128,828 | A * | 7/1992 | Mrenna | H02B 1/044 | 361/627 |
| 6,184,595 | B1 * | 2/2001 | Flegel, Jr. | H01H 9/26 | 307/115 |

(Continued)

*Primary Examiner* — Anatoly Vortman
(74) *Attorney, Agent, or Firm* — Eckert Seamans Cherin & Mellott, LLC

(57) ABSTRACT

A load center includes: a housing including a base and sidewalls; one or more circuit interrupters including a first circuit interrupter having a first type of mounting mechanism and a second circuit interrupter having a second type of mounting mechanism; and a universal circuit interrupter mounting assembly attached to the base and including a mounting frame and line terminals structured to connect the circuit interrupter line terminals and the power source, the mounting frame including (i) a first type mounting connector having a first protrusion and side edges thereof and structured to be coupled to the first type of mounting mechanism and (ii) a second type mounting connector having a second protrusion and transversely spaced-apart legs extending longitudinally therefrom and attached to the side edges of the first type mounting connector, the second type mounting connector being structured to be coupled to the second type of mounting mechanism.

20 Claims, 7 Drawing Sheets

(56) References Cited

U.S. PATENT DOCUMENTS

| | | | | | |
|---|---|---|---|---|---|
| 6,262,880 | B1 * | 7/2001 | Fischer | H01R 9/26 | 361/828 |
| 8,040,663 | B1 * | 10/2011 | Czarnecki | H01H 9/26 | 361/635 |
| 8,514,551 | B2 * | 8/2013 | Cosley | H02B 1/32 | 361/635 |
| 8,902,570 | B2 * | 12/2014 | Cosley | H02B 1/42 | 361/635 |
| 2004/0169577 | A9 * | 9/2004 | Montante | H01H 1/52 | 337/186 |
| 2013/0016455 | A1 * | 1/2013 | Mooney | H01H 9/26 | 361/637 |

* cited by examiner

UNIVERSAL CIRCUIT INTERRUPTER MOUNTING ASSEMBLIES

FIELD OF THE INVENTION

The disclosed concept relates generally to an apparatus and method of circuit protection, and in particular, to a universal circuit interrupter mounting assemblies for use in a load center.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Molded case circuit breakers, for example, include at least one pair of separable contacts which may be operated either manually by way of a handle disposed on the outside of the case or automatically in response to an overcurrent condition. In the automatic mode of operation, an electronic trip unit, for example, controls an operating mechanism that opens the separable contacts. In the manual mode of operation, the handle cooperates with the operating mechanism in order to open the separable contacts. Circuit breakers have at least one line terminal for connection to a power source and at least one load terminal for connection to a load, such as a motor. The separable contacts of the circuit breakers are internally connected to the line and load terminals.

Circuit interrupters are mounted in cabinets or panelboards for residential or commercial markets. For example, molded circuit breakers have two different types of mounting mechanisms: a first type including, e.g., without limitation, CH, CHF, RO, CHQ types and a second type including, e.g., without limitation, QO, BTN types. These mounting mechanisms are then affixed to a load center or panelboard using circuit interrupter mounting assemblies specifically designed for each type of the mounting mechanisms of the circuit breakers. The technologies for circuit breaker mounting assemblies are continuously developing.

SUMMARY OF THE INVENTION

These needs, and others, are met by a load center structured to connect loads to a power source. The load center includes: a housing including a base and sidewalls extending laterally from the base; one or more circuit interrupters including at least one of a first circuit interrupter having a first type of mounting mechanism and a second circuit interrupter having a second type of mounting mechanism, each circuit interrupter having circuit interrupter line terminals; and a universal circuit interrupter mounting assembly structured to be attached to the base and including a mounting frame and line terminals extending longitudinally from one end of the mounting frame and structured to connect the circuit interrupter line terminals and the power source, the mounting frame including a first type mounting connector having a first protrusion and side edges thereof, the first mounting connector being structured to be coupled to the first type of mounting mechanism of the first circuit interrupter, the mounting frame further including a second type mounting connector having a second protrusion and transversely spaced-apart legs extending longitudinally therefrom and attached to the side edges of the first type mounting connector at one end, the second type mounting connector being structured to be coupled to the second type of mounting mechanism of the second circuit interrupter.

Another example embodiment includes a universal circuit interrupter mounting assembly structured to be attached to a base of a load center and mount one or more circuit interrupters on the base, each circuit interrupter having circuit interrupter line terminals and a first type of mounting mechanism or a second type of mounting mechanism. The universal circuit interrupter mounting assembly includes: a mounting frame including a first type mounting connector and a second type mounting connector, the first type mounting connector having a first protrusion and side edges thereof, the first mounting connector being structured to be coupled to the first type of mounting mechanism of a first circuit interrupter, the second type mounting connector having a second protrusion and transversely spaced-apart legs extending longitudinally therefrom and attached to the side edges of the first type mounting connector at one end, the second type mounting connector being structured to be coupled to the second type of mounting mechanism of a second circuit interrupter; and line terminals extending longitudinally from one end of the mounting frame and structured to connect the circuit interrupter line terminals and a power source.

Yet another example embodiment includes a method of providing circuit protection using one or more circuit interrupters disposed in a load center and connected between a power source and a load. The method includes attaching a universal circuit interrupter mounting assembly to a base of a load center, the universal circuit interrupter mounting assembly being structured to mount one or more circuit interrupters on the base, each circuit interrupter having circuit interrupter line terminals and a first type of mounting mechanism or a second type of mounting mechanism, the universal circuit interrupter mounting assembly comprising: (i) a mounting frame including a first type mounting connector and a second type mounting connector, the first type mounting connector having a first protrusion and side edges thereof, the first mounting connector being structured to be coupled to the first type of mounting mechanism of a first circuit interrupter, the second type mounting connector having a second protrusion and transversely spaced-apart legs extending longitudinally therefrom and attached to the side edges of the first type mounting connector at one end, the second type mounting connector being structured to be coupled to the second type of mounting mechanism of a second circuit interrupter; and (ii) line terminals extending longitudinally from one end of the mounting frame and structured to connect the circuit interrupter line terminals and the power source; mounting the one or more circuit interrupters in one or more poles of the universal circuit interrupter mounting assembly; and connecting the one or more circuit interrupters to the load and the power source via the circuit interrupter line connectors and the line terminals of the universal circuit interrupter mounting assembly.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
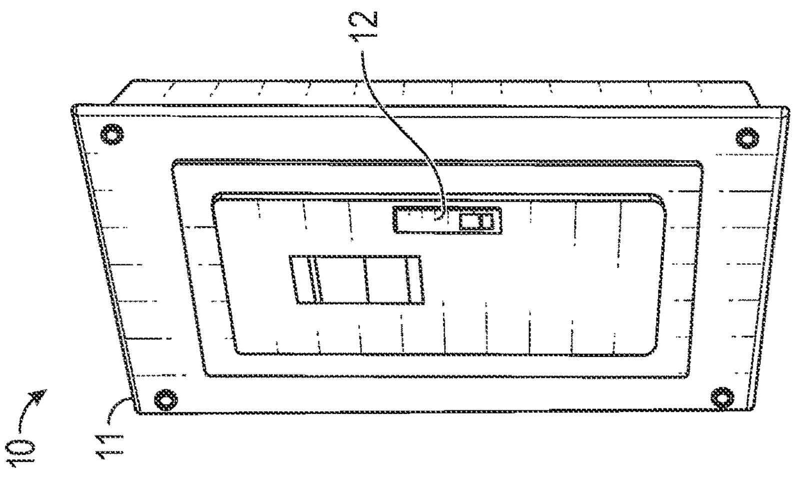
FIG. 1 is a perspective view of a load center assembly according to a non-limiting, example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIGS. 1-3A illustrate a load center 10 including one or more circuit breakers 100, 200, an exemplary universal circuit interrupter mounting assembly 1000 and/or components thereof according to a non-limiting, example embodiment of the disclosed concept. The load center 10 is a standard residential or commercial load center and includes a housing 11, one or more circuit interrupters 100, 200 and a universal circuit interrupter mounting assembly 1000. The housing 11 includes a base 14 and sidewalls 15 extending laterally from the base 14. The base 14 and the sidewalls 15 form a compartment 16 in which one or more circuit interrupters 100, 200 may be disposed. The housing 11 also includes a door 12 hinged at a first side edge and latches on and off at a second side edge opposite the first side edge. The one or more circuit interrupters 100, 200 may be, e.g., without limitation, molded circuit breakers, and include at least one of a first circuit interrupter 100 having a first type 110 of mounting mechanism and a second circuit interrupter 200 having a second type 210 of mounting mechanism, each circuit interrupter 100, 200 having circuit interrupter line terminals 101, 201. The circuit interrupters 100, 200 are discussed in detail with reference to FIGS. 4 and 5A-B. The universal circuit interrupter mounting assembly 1000 is discussed in detail with reference to FIGS. 1B-3A.

Figure 4:
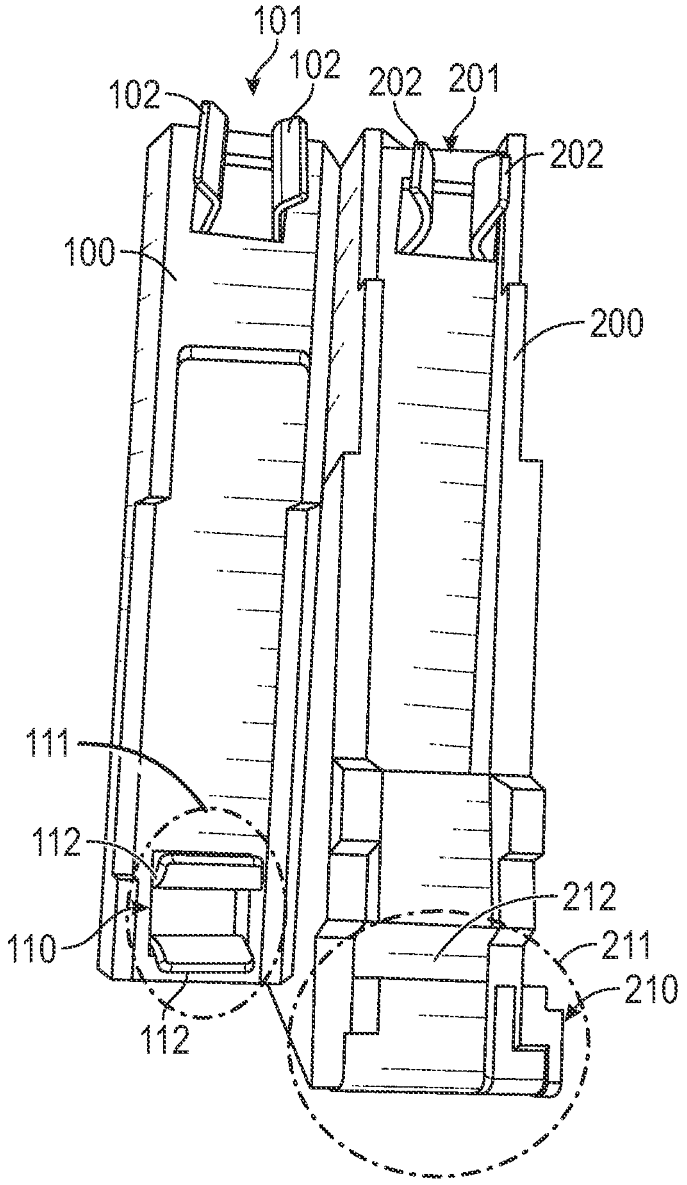
FIG. 4 illustrates two example circuit breakers having specific mounting mechanisms thereof.
Figure 5C:
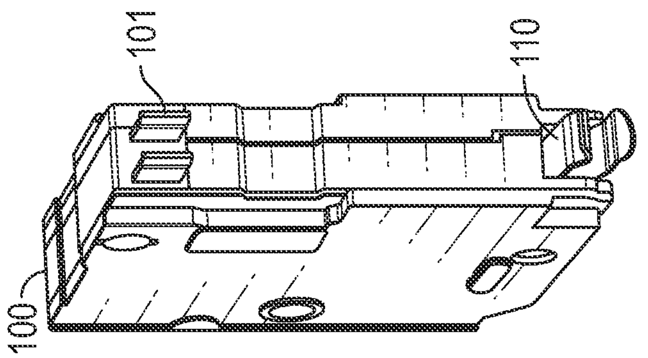
FIG. 5 is a perspective view of an exemplary universal circuit breaker mounting assembly installed in a load center in accordance with an example embodiment of the disclosed concept.
FIGS. 5A-B illustrate two example circuit breakers having specific mounting mechanisms to be installed within the exemplary universal circuit breaker mounting assembly of FIG. 5 according to a non-limiting, example embodiment of the disclosed concept.
Figure 5B:
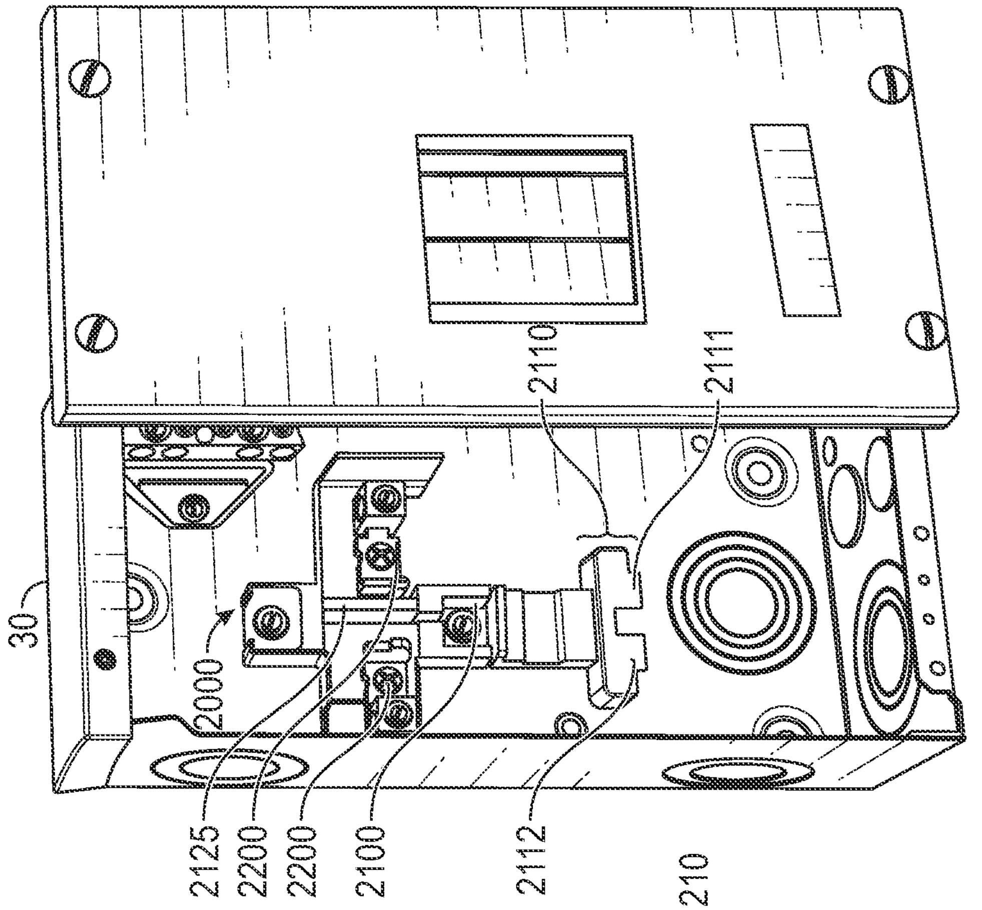
Figure 5A:
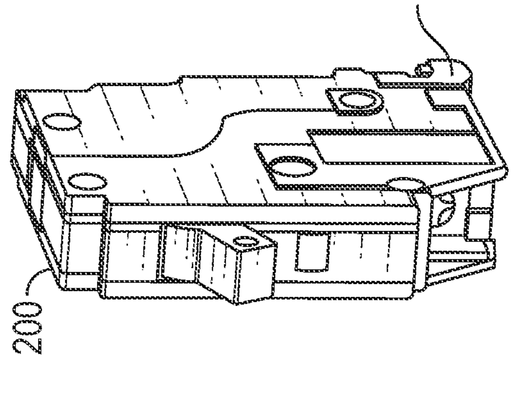

FIGS. 4 and 5A-B illustrate two example circuit interrupters 100, 200 each having specific types 110, 210 of mounting mechanisms structured to affix the circuit interrupters 100, 200 to a load center 10, 30. The circuit interrupters 100, 200 are standards 19 mm-thick (¾ inch-thick) circuit interrupters and include circuit interrupter line terminals 101, 201 at one end and specific types 110, 210 of mounting mechanisms at the other end laterally opposite the one end. The line terminals 101, 201 each include two line conductors 102 and 202, respectively. The two line conductors 102, 202 may be transversely-spaced apart from each other and structured to receive the line conductors 1200 (particularly, conducting elements 1220) therebetween. In general, there are two specific types 110, 210 of the mounting mechanisms designed in accordance with the manufacturers' specifications. The first type 110 (see area 111) has two longitudinally-spaced apart connectors 112 extending outwardly and transversely at the other end of the first circuit interrupter 100. As such, the conventional mounting assembly for the circuit interrupters 100 having the first type 110 of mounting mechanism includes components to receive or fit between the two connectors 112. The second type 210 of mounting mechanism has a receptacle 212 extending inwardly and downwardly when installed within the load center. As such, the conventional mounting assembly for the second circuit interrupter 200 having the second type 210 of the mounting mechanism includes a mechanism that can be received or fit inwardly and downwardly within the receptacle 212 when the second circuit interrupter 200 is disposed within the load center 10. The conventional mounting assemblies, however, are installed in the load centers at manufacturing, thereby limiting the type of circuit interrupters that can be used in the load centers. Manufacturing load centers with a specific type of mounting assemblies designed only for mounting the circuit interrupters having one type of mounting mechanism is expensive and inefficient, especially if the regions in which the load centers are to be supplied utilize predominantly the circuit interrupters having the other type of the mounting mechanism. In those circumstances, the load centers become useless or result in limited utility, and load centers having another specific type of mounting assemblies specifically designed for mounting the circuit interrupter having the other type of the mounting mechanism must be ordered, manufactured and supplied to the customers, resulting additional costs and wastes of manufacturing costs.

Figure 1A:
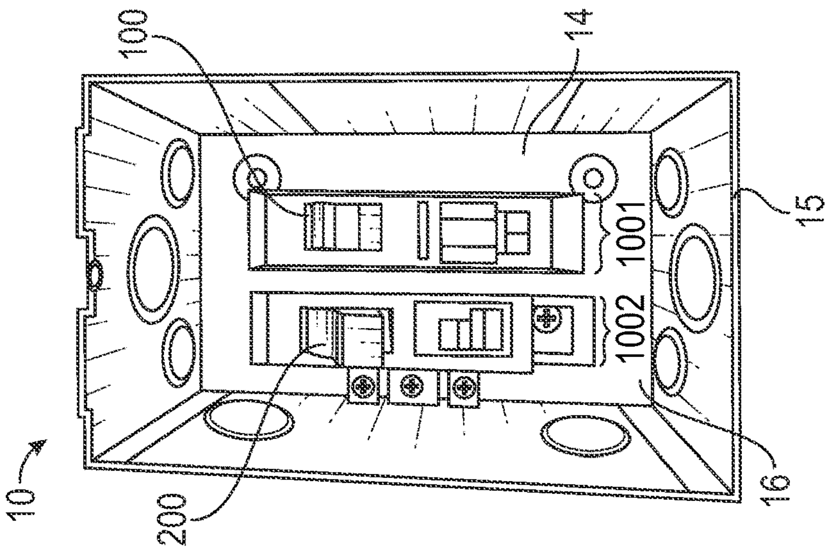
FIG. 1A is an elevation view of the load center of FIG. 1.
Figure 1B:
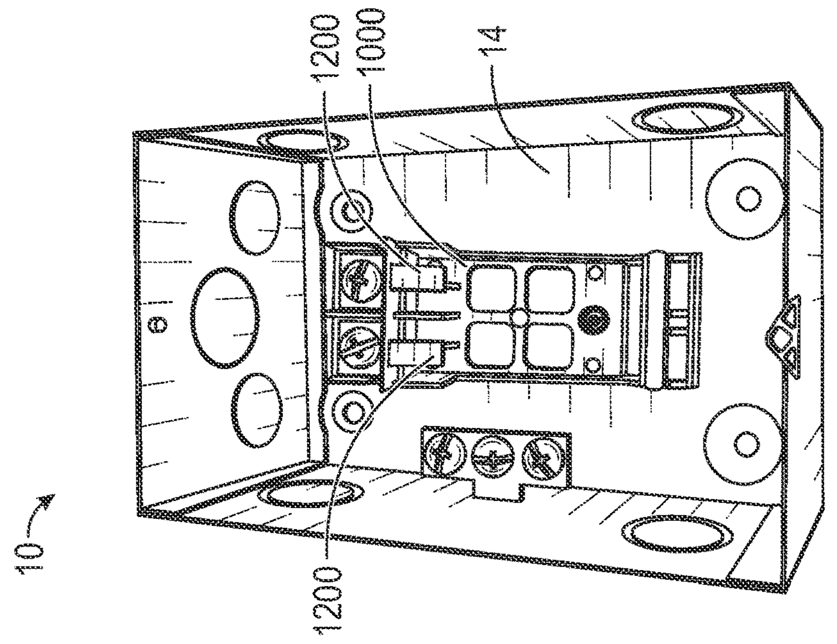
FIG. 1B is an elevation view of the load center with an exemplary universal circuit interrupter mounting assembly attached thereto according to a non-limiting, example embodiment of the disclosed concept.
Figure 2A:
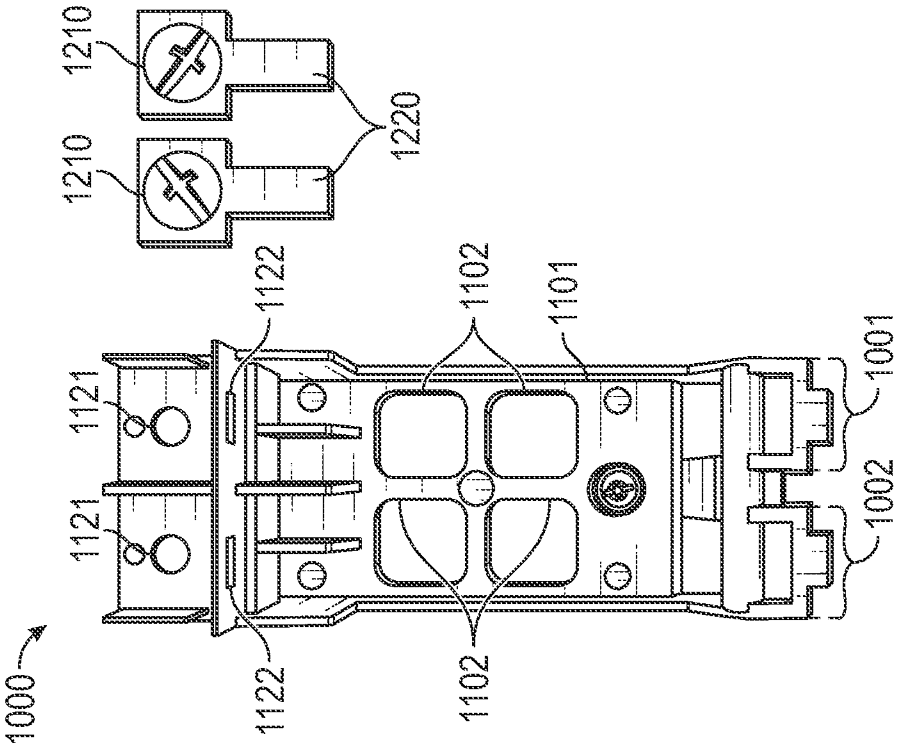
FIG. 2A is a top view of components of the exemplary universal circuit interrupter mounting assembly of FIG. 2.
Figure 2:
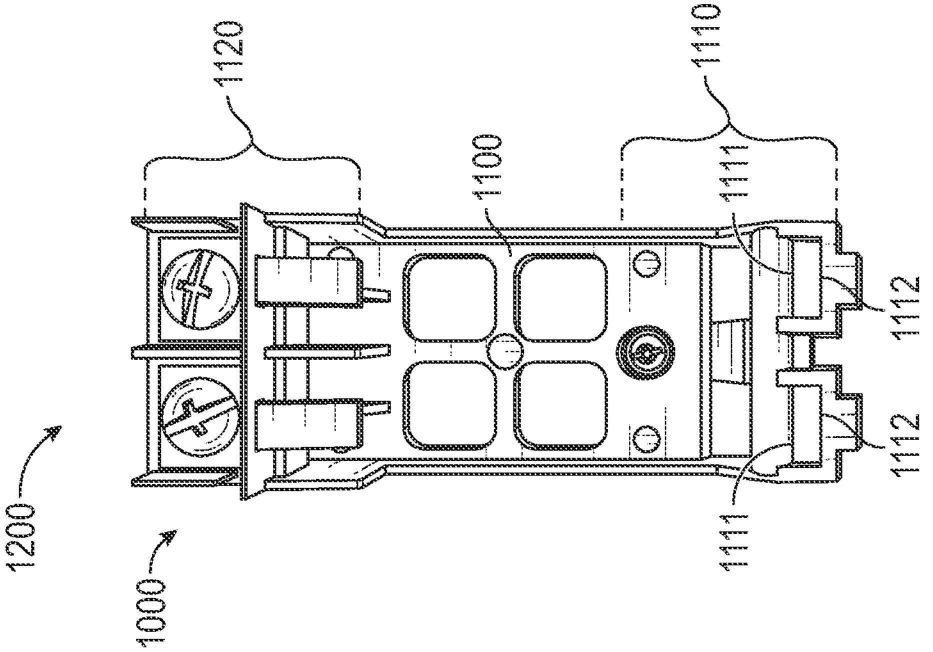
FIG. 2 is a top view of the exemplary universal circuit interrupter mounting assembly according to a non-limiting, example embodiment of the disclosed concept.
Figure 2B:
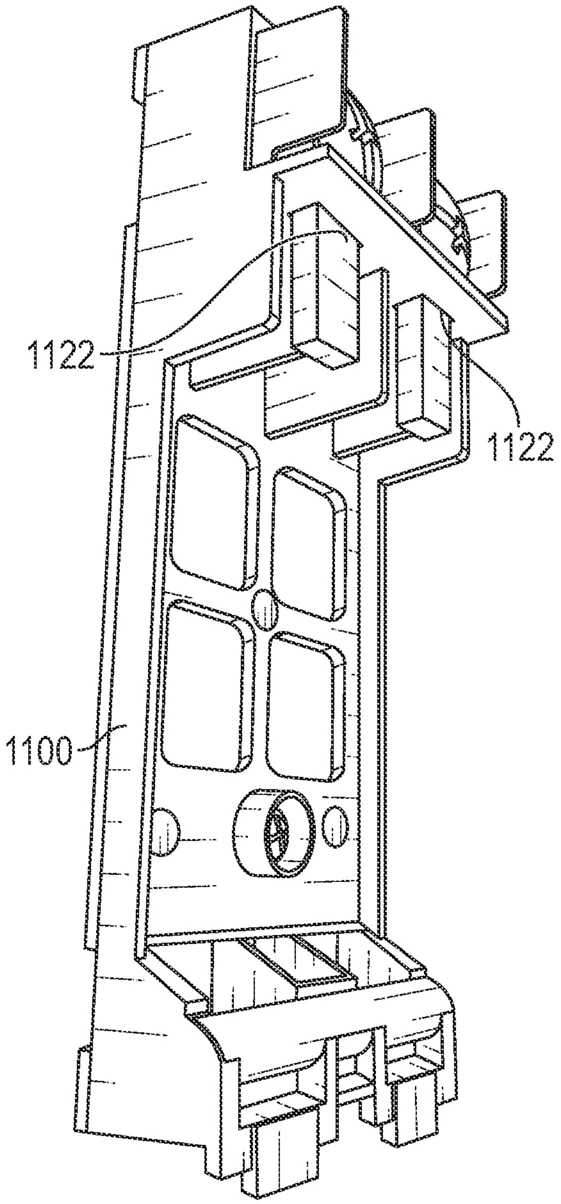
FIG. 2B is a perspective side view of the exemplary universal circuit interrupter mounting assembly of FIG. 2.
Figure 3:
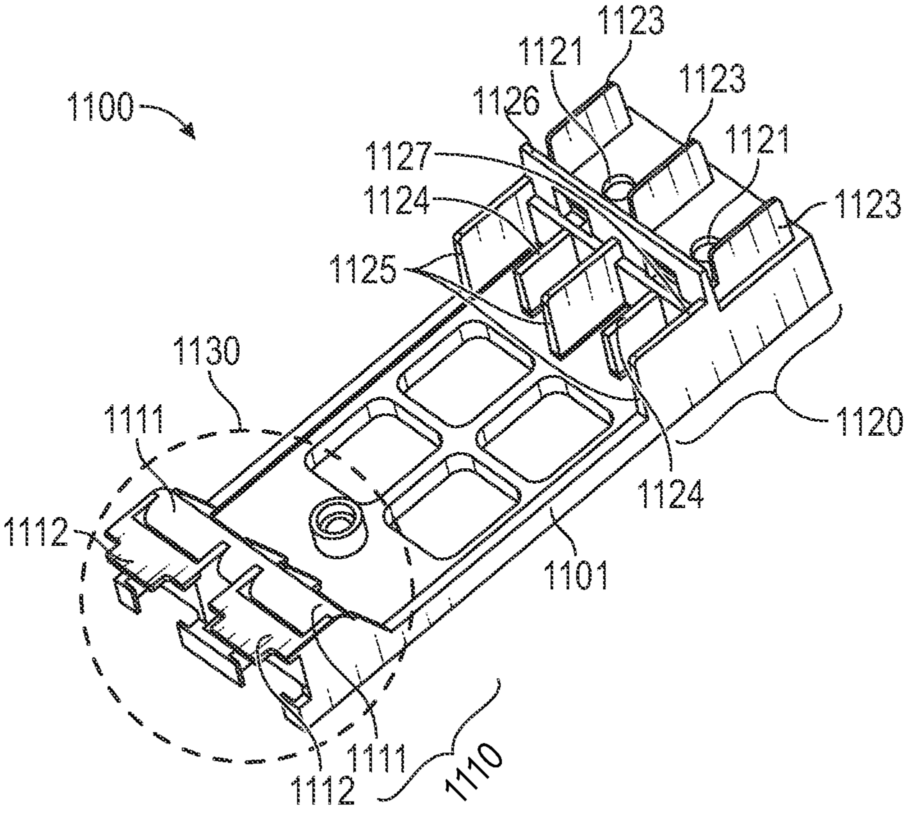
FIG. 3 is a perspective top view of the exemplary universal circuit interrupter of FIG. 2 without the line terminals.
Figure 3A:
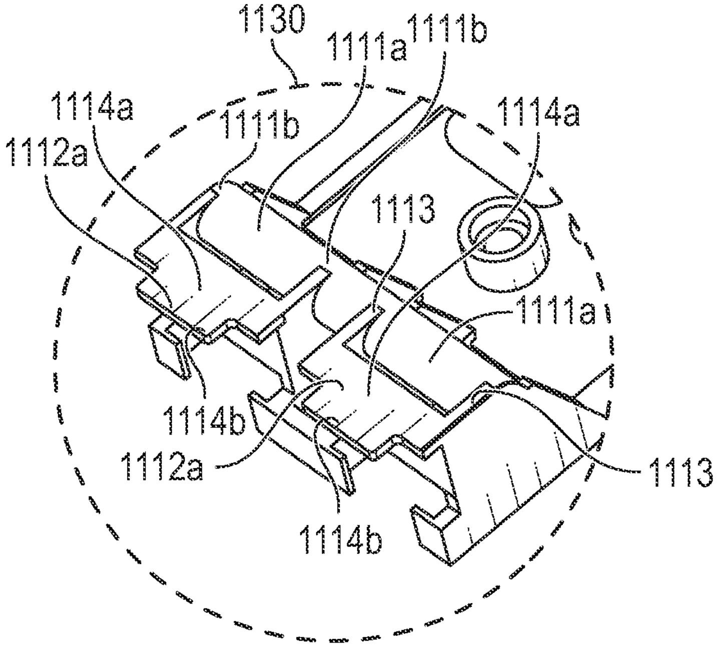
FIG. 3A is an enlarged view of a universal mounting connection portion of the exemplary universal circuit interrupter mounting assembly of FIG. 2.

The exemplary universal circuit interrupter mounting assembly 1000 prevents incurring such unnecessary additional costs and wastes by providing a mounting assembly 1000 capable of mounting at least the first type 110 and the second type 210 of mounting assemblies. As shown in FIG. 1A, the universal circuit interrupter mounting assembly 1000 is structured to mount a first circuit interrupter 100 having a first type 110 of mounting mechanism in a first pole 1001 and a second circuit interrupter 200 having a second type 210 of mounting mechanism in a second pole 1002. While FIG. 1A shows the universal circuit interrupter mounting assembly 1000 mounting the first circuit interrupter 100 having the first type 110 of mounting mechanism in its first pole 1001 and the second circuit interrupter 200 having the second type 210 of mounting mechanism in the second pole 1002, it is to be understood that the second circuit interrupter 200 having the second type 210 of mounting mechanism can be mounted in the first pole 1001 of the universal circuit interrupter mounting assembly 1000 and the first circuit interrupter 100 having the first type 110 of mounting mechanism can be mounted in the second pole 1002. Further, it is to be understood that while FIGS. 1A-3A illustrate a two-pole universal circuit interrupter mounting assembly 1000, each pole 1001, 1002 of the universal circuit interrupter mounting assembly 1000 may be used individually to mount 1-pole circuit interrupter having either type 110, 210 of the mounting mechanism. Further, a plurality of the universal circuit interrupter mounting assemblies 1000 may be mounted adjacent to one another on the base 14 of the load center 10 and utilized to mount one or more multi-pole circuit interrupters having either type 110, 210 of the mounting mechanism. For example, three universal circuit interrupter mounting assemblies 1000 may be used to mount three two-pole or one six-pole circuit interrupters. In some examples, a three-pole circuit interrupter having either type 110, 210 of the mounting mechanism can be mounted to the base 14 of the load center 10.

As shown in FIGS. 1B-3A, the universal circuit interrupter mounting assembly 1000 is structured to be attached to the base 14 of the load center 10 and includes a mounting frame 1100 and line terminals 1200 extending longitudinally from one end of the mounting frame 1100 and structured to connect the circuit interrupter line terminals 101, 201 and the power source (not shown). The mounting frame 1100 includes a first type mounting connector 1111 having a first protrusion 1111*a* and side edges 1111*b* thereof, the first type mounting connector 1111 being structured to be coupled to the first type 110 of mounting mechanism of the first circuit interrupter 100. The mounting frame 1100 further includes a second type mounting connector 1112 having a second protrusion 1112*a* and transversely spaced-apart legs 1113 extending longitudinally therefrom and attached to the side edges 1111*b* of the first type mounting connector 1111 at one end. The second type mounting connector 1112 is structured to be coupled to the second type 210 of mounting mechanism of the second circuit interrupter 200. Optionally, the line terminals 1200 include fixing elements 1210 and conducting elements 1220. The conducting elements 1220 are structured to be coupled to the line terminals 101, 201 of the one or more circuit interrupters 100, 200 and the fixing elements 1210 are structured to connect the conducting elements 1220 to the power source and affix the mounting frame 1100 on to the base 14 of the load center 10. The fixing elements 1210 may be, e.g., without limitation, screws. The mounting frame 1100 includes a mounting base 1101, a universal mounting connector portion 1110 at one end of the mounting base 1101, and a line terminal connecting portion 1120 at the other end of the mounting base 1101. The mounting frame 1100 may be, e.g., without limitation, molded thermoplastic. The mounting base 1101 may include one or more holes 1102 for, e.g., without limitation, cost saving. The line terminal connecting portion 1120 includes first thru-holes 1121 via which the fixing elements 1210 affix the mounting frame 1100 to the base 14 of the load center 10 and a transverse wall 1126 extending outwardly and transversely from the mounting base 1101 at the other end, the transverse wall 1126 including second thru-holes 1122 via which the conducting elements 1220 pass. Optionally, the line terminal connecting portion 1120 may also include holders 1124 extending laterally and outwardly from the mounting base 1101 such that the line terminals 1120 (the conducting elements 1220) are disposed on the top of the holders 1125. Optionally, the line terminal connecting portion 1120 may also include pole dividers 1123, 1125 for the line terminals 1200 such that the line terminals 1200 are disposed within each pole.

Optionally, the first protrusion 1111*a* of the first type mounting connector 1111 may be structured to be removably received or fit (e.g., without limitation, snapped into) between the two longitudinally-spaced apart connectors 112 of the first type 110 of mounting mechanism of the first circuit interrupter 100, the two longitudinally-spaced apart connectors 112 extending outwardly and transversely. Optionally, the first protrusion 1111*a* may have curved surface so as to ease its insertion between the two longitudinally-spaced apart connectors 112. The second type mounting connectors 1112 may include a second protrusion 1112*a* and two transversely spaced-apart legs 1113 extending therefrom. The two transversely spaced-apart legs 1113 are attached to the side edges 1111*b* of the first protrusion 1111*a* of the first type mounting connectors 1111. The side edges 1111*b* may be flat. Optionally, the receptacle 212 of the second type 210 of mounting mechanism of the second circuit interrupter 200 may include a first receptacle portion (not shown) and a second receptacle portion (not shown). Optionally, the second flat protrusion 1112*a* may include a first flat portion 1114*a* and a second flat portion 1114*b*. The first flat portion 1114*a* may be structured to removably fit within the first receptacle portion of the receptacle 212 and the second flat portion 1114*b* may be structured to removably fit within the second receptacle portion of the receptacle 212 such that the second circuit interrupter 200 is securely and removably coupled to the universal circuit interrupter mounting assembly 1000.

Accordingly, by providing both a first type mounting connector 1111 structured to mount the first circuit interrupter 100 having the first type 110 of mounting mechanism and a second type mounting connector 1112 structured to mount the second circuit interrupter 200 having the second type 210 of mounting mechanism, the universal circuit interrupter mounting assembly 1100 allows users to freely select and use any type of circuit interrupters regardless of the specific types of the mounting mechanism that the selected circuit interrupters may have, thereby increasing efficiency and user convenience and reducing unnecessary costs incurred by using the conventional mounting assemblies that require specific load centers manufactured for specific types of mounting mechanism of the circuit interrupters in use. Further, by having the second type mounting connectors 1112 to extend from the side edges 1111*b* of the first type mounting connectors 1111, the universal circuit interrupter mounting assembly 1000 provides for mounting the circuit breakers having any type 110, 210 of mounting mechanism, utilizing the same amount or substantially same amount of space required to provide one conventional mounting assembly that is designed to mount only the circuit breakers having specified type 110, 210 of mounting mechanism, thereby further saving manufacturing costs and panel space of the load center 10.

FIGS. 5, 5A and 5B illustrate another exemplary universal circuit interrupter mounting assembly 2000 affixed to a load center 30 according to a non-limiting, example embodiment of the disclosed concept. The universal circuit interrupter mounting assembly 2000 is similar to the universal circuit interrupter mounting assembly 1000 of FIGS. 1-3A, and thus description of the similar features is omitted for brevity. The universal circuit interrupter mounting assembly 2000 includes the mounting frame 2100 having the line terminals 2200 extending transversely, a pole divider 2125, and a universal mounting connector portion 2110. The universal mounting connector portion 2110 includes a first type mounting connector 2111 structured to mount the first circuit breaker 100 having the first type 110 of mounting mechanism and a second type mounting connector 2112 structured to mount the second circuit breaker 200 having the second type 210 of mounting mechanism. The first type mounting connector 2111 may be a rectangular projection extending outwardly and laterally and structured to fit between the two vertically-spaced apart connectors 112. The second type mounting connector 2112 may be a flat rectangular projection extending downwardly and structured to fit within the receptacle 212 of the second type 210 of mounting mechanism.

Figure 6:
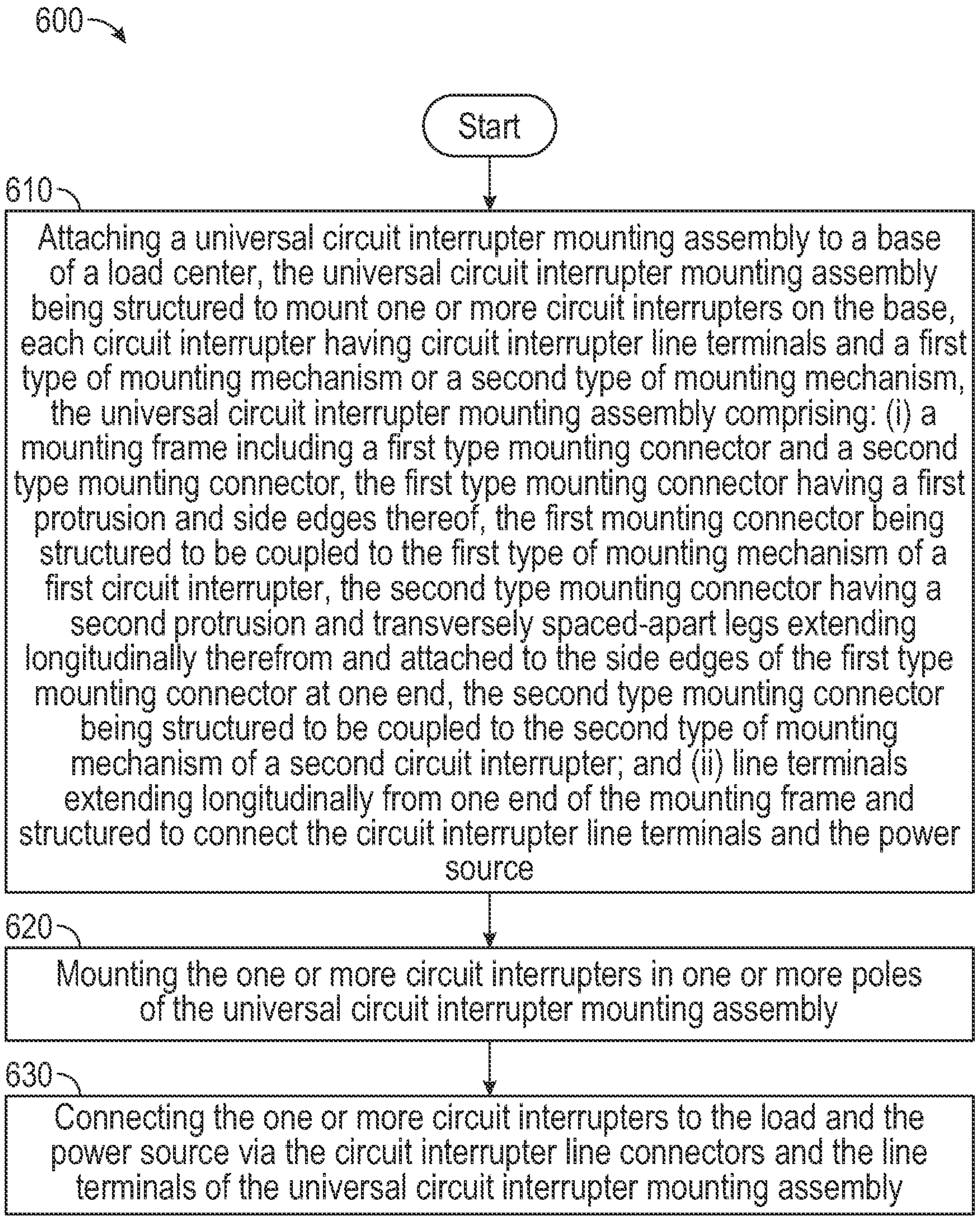
FIG. 6 is a flow chart for a method of providing circuit protection using one or more circuit interrupters disposed in a load center and connected between a power source and a load according to a non-limiting, example embodiment of the disclosed concept.

FIG. 6 is a flow chart for a method 600 of providing circuit protection using one or more circuit interrupters disposed in a load center and connected between a power source and a load according to a non-limiting, example embodiment of the disclosed concept. The method 600 may be performed using the universal circuit interrupter mounting assembly 10, 30 as illustrated in FIGS. 1-5B and any components thereof.

At 610, the universal circuit interrupter mounting assembly is attached to a base of a load center. The universal circuit interrupter mounting assembly is structured to mount one or more circuit interrupters on the base, each circuit interrupter having circuit interrupter line terminals and a first type of mounting mechanism or a second type of mounting mechanism. The universal circuit interrupter mounting assembly includes: (i) a mounting frame including a first type mounting connector and a second type mounting connector, the first type mounting connector having a first protrusion and side edges thereof, the first mounting connector being structured to be coupled to the first type of mounting mechanism of a first circuit interrupter, the second type mounting connector having a second protrusion and transversely spaced-apart legs extending longitudinally therefrom and attached to the side edges of the first type mounting connector at one end, the second type mounting connector being structured to be coupled to the second type of mounting mechanism of a second circuit interrupter; and (ii) line terminals extending longitudinally from one end of the mounting frame and structured to connect the circuit interrupter line terminals and the power source.

At 620, the one or more circuit interrupters is mounted in one or more poles of the universal circuit interrupter mounting assembly.

At 630, the one or more circuit interrupters are connected to the load and the power source via the circuit interrupter line connectors and the line terminals of the universal circuit interrupter mounting assembly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A load center, comprising:

a housing including a base and sidewalls extending laterally from the base;

one or more circuit interrupters including at least one of a first circuit interrupter having a first type of mounting mechanism and a second circuit interrupter having a second type of mounting mechanism, each of the one or more circuit interrupters having circuit interrupter line terminals; and a universal circuit interrupter mounting assembly attached to the base and including a mounting frame and line terminals extending longitudinally from a line terminal connecting portion end of the mounting frame and configured to connect the circuit interrupter line terminals and a power source, the mounting frame including a first type mounting connector having a first protrusion and side edges thereof, the first type mounting connector couples to the first type of mounting mechanism of the first circuit interrupter, the mounting frame further including a second type mounting connector having a second protrusion and transversely spaced-apart legs extending longitudinally therefrom and attached to the side edges of the first type mounting connector at a universal mounting connector portion end of the mounting frame, the second type mounting connector couples to the second type of mounting mechanism of the second circuit interrupter.

2. The load center of claim 1, wherein the first type of mounting mechanism of the first circuit interrupter comprises two longitudinally-spaced apart connectors extending outwardly and transversely at a mounting mechanism end of the first circuit interrupter.

3. The load center of claim 2, wherein the first protrusion of the first type mounting connector of the universal circuit interrupter mounting assembly is received between the two longitudinally-spaced apart connectors of the first type of mounting mechanism of the first circuit interrupter.

4. The load center of claim 3, wherein the first protrusion of the first type mounting connector has a curved surface.

5. The load center of claim 1, wherein the second type of mounting mechanism of the second circuit interrupter comprises a receptacle extending inwardly and downwardly in the second circuit interrupter when the second circuit interrupter is installed within the load center.

6. The load center of claim 5, wherein the second protrusion of the second type mounting connector is received within the receptacle of the second type of mounting mechanism of the second circuit interrupter.

7. The load center of claim 6, wherein the second protrusion is flat.

8. The load center of claim 7, wherein the receptacle of the second type of mounting mechanism includes a first receptacle portion and a second receptacle portion different from the first receptacle portion.

9. The load center of claim 8, wherein the second protrusion includes a first flat portion that fits within the first receptacle portion and a second flat portion that fits within the second receptacle portion such that the second circuit interrupter is securely and removably coupled to the universal circuit interrupter mounting assembly.

10. The load center of claim 1, wherein the universal circuit interrupter mounting assembly comprises at least one of a single-pole universal circuit interrupter mounting assembly and a multi-pole universal circuit interrupter mounting assembly.

11. A universal circuit interrupter mounting assembly that attaches to a base of a load center and mounts one or more circuit interrupters on the base, each of the one or more circuit interrupters having circuit interrupter line terminals and a first type of mounting mechanism or a second type of mounting mechanism, the universal circuit interrupter mounting assembly comprising:

a mounting frame including a first type mounting connector and a second type mounting connector, the first type mounting connector having a first protrusion and side edges thereof, the first type mounting connector couples to the first type of mounting mechanism of a first circuit interrupter, the second type mounting connector having a second protrusion and transversely spaced-apart legs extending longitudinally therefrom and attached to the side edges of the first type mounting connector at a universal mounting connector portion end of the mounting frame, the second type mounting connector couples to the second type of mounting mechanism of a second circuit interrupter; and line terminals extending longitudinally from a line terminal connecting portion end of the mounting frame that connect the circuit interrupter line terminals and a power source.

12. The universal circuit interrupter mounting assembly of claim 11, wherein the first type of mounting mechanism of the first circuit interrupter comprises two longitudinally-spaced apart connectors extending outwardly and transversely at a mounting mechanism end of the first circuit interrupter.

13. The universal circuit interrupter mounting assembly of claim 12, wherein the first protrusion of the first type mounting connector of the universal circuit interrupter mounting assembly is received between the two longitudinally-spaced apart connectors of the first type of mounting mechanism of the first circuit interrupter.

14. The universal circuit interrupter mounting assembly of claim 13, wherein the first protrusion of the first type mounting connector has a curved surface.

15. The universal circuit interrupter mounting assembly of claim 11, wherein the second type of mounting mechanism of the second circuit interrupter comprises a receptacle extending inwardly and downwardly in the second circuit interrupter when the second circuit interrupter is installed within the load center.

16. The universal circuit interrupter mounting assembly of claim 15, wherein the second protrusion of the second type mounting connector is received within the receptacle of the second type of mounting mechanism of the second circuit interrupter.

17. The universal circuit interrupter mounting assembly of claim 16, wherein the receptacle of the second type of mounting mechanism includes a first receptacle portion and a second receptacle portion different from the first receptacle portion, and wherein the second protrusion includes a first flat portion that fits within the first receptacle portion and a second flat portion that fits within the second receptacle portion such that the second circuit interrupter is securely and removably coupled to the universal circuit interrupter mounting assembly.

18. A method of providing circuit protection using one or more circuit interrupters disposed in a load center and connected between a power source and a load, comprising:

attaching a universal circuit interrupter mounting assembly to a base of the load center, the universal circuit interrupter mounting assembly mounting the one or more circuit interrupters on the base, each of the one or more circuit interrupters having circuit interrupter line terminals and a first type of mounting mechanism or a second type of mounting mechanism, the universal circuit interrupter mounting assembly comprising: (i) a mounting frame including a first type mounting connector and a second type mounting connector, the first type mounting connector having a first protrusion and side edges thereof, the first type mounting connector couples to the first type of mounting mechanism of a first circuit interrupter, the second type mounting connector having a second protrusion and transversely spaced-apart legs extending longitudinally therefrom and attached to the side edges of the first type mounting connector at a universal mounting connector portion end of the mounting frame, the second type mounting connector couples to the second type of mounting mechanism of a second circuit interrupter; and (ii) line terminals extending longitudinally from a line terminal connecting portion end of the mounting frame that connect the circuit interrupter line terminals and the power source;

mounting the one or more circuit interrupters in one or more poles of the universal circuit interrupter mounting assembly; and connecting the one or more circuit interrupters to the load and the power source via the circuit interrupter line connectors and the line terminals of the universal circuit interrupter mounting assembly.

19. The method of claim 18, wherein mounting the one or more circuit interrupters in the one or more poles of the universal circuit interrupter mounting assembly comprises:

mounting the first circuit interrupter having the first type of mounting mechanism via the first type mounting connector in a first pole of the universal circuit interrupter mounting assembly and mounting the second circuit interrupter having the second type of mounting mechanism via the second type mounting connector in a second pole of the universal circuit interrupter mounting assembly, or mounting the first circuit interrupter having the first type of mounting mechanism via the first type mounting connector in the second pole of the universal circuit interrupter mounting assembly and mounting the second circuit interrupter having the second type of mounting mechanism via the second type mounting connector in the first pole of the universal circuit interrupter mounting assembly.

20. The method of claim 18, wherein mounting the one or more circuit interrupters in one or more poles of the universal circuit interrupter mounting assembly comprises:

mounting the first circuit interrupter having the first type of mounting mechanism via the first type mounting connector in a first pole of the universal circuit interrupter mounting assembly;

mounting the second circuit interrupter having the second type of mounting mechanism via the second type mounting connector in a second pole of the universal circuit interrupter mounting assembly;

mounting a third circuit interrupter having the first type of mounting mechanism via the first type mounting connector in a third pole of the universal circuit interrupter mounting assembly; and mounting a fourth circuit interrupter having the second type of mounting mechanism via the second type mounting connector in a fourth pole of the universal circuit interrupter mounting assembly.

* * * * *